US010203983B2

United States Patent
Kaneko (10) Patent No.: US 10,203,983 B2
(45) Date of Patent: Feb. 12, 2019

(54) EXECUTION CONTROL DEVICE THAT CAUSES OTHER ELECTRONIC DEVICE TO EXECUTE TASK, NON-TRANSITORY COMPUTER-READABLE RECORDING MEDIUM THAT INCLUDES EXECUTION CONTROL PROGRAM, AND TASK EXECUTION SYSTEM

(71) Applicant: KYOCERA Document Solutions Inc., Osaka (JP)

(72) Inventor: Kotaro Kaneko, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 141 days.

(21) Appl. No.: 15/361,774

(22) Filed: Nov. 28, 2016

(65) Prior Publication Data

US 2017/0153913 A1   Jun. 1, 2017

(30) Foreign Application Priority Data

Nov. 30, 2015   (JP) ................................. 2015-232781

(51) Int. Cl.
   *G06F 9/48*   (2006.01)
   *G06F 9/46*   (2006.01)

(52) U.S. Cl.
   CPC ............ *G06F 9/4843* (2013.01); *G06F 9/485* (2013.01)

(58) Field of Classification Search
   None
   See application file for complete search history.

(56) References Cited

U.S. PATENT DOCUMENTS

| 5,606,493 A | 2/1997 | Duscher et al. |
| 2014/0282557 A1* | 9/2014 | He ............................ G06F 9/54 718/102 |
| 2015/0172133 A1* | 6/2015 | Nagashima ......... G06F 9/44526 709/223 |

FOREIGN PATENT DOCUMENTS

JP   3612652 B2   1/2005

* cited by examiner

*Primary Examiner* — Eric C Wai
(74) *Attorney, Agent, or Firm* — IP Business Solutions, LLC (57) ABSTRACT

An execution control device as an electronic device causes a task starting system to execute a task. The task starting system is provided in a task starting device and starts tasks in turn. The task starting device is another electronic device. The execution control device includes a control section and a storage section. The control section governs over all operation controls of the execution control device. The storage section stores an execution control program designed for causing the task starting system to execute the task. The control section operates as a task registration section that registers with the task starting system the task executable by the task starting system by operating the execution control program stored in the storage section.

4 Claims, 12 Drawing Sheets

_EXECUTION CONTROL DEVICE THAT CAUSES OTHER ELECTRONIC DEVICE TO EXECUTE TASK, NON-TRANSITORY COMPUTER-READABLE RECORDING MEDIUM THAT INCLUDES EXECUTION CONTROL PROGRAM, AND TASK EXECUTION SYSTEM_

INCORPORATION BY REFERENCE

This application claims priority to Japanese Patent Application No. 2015-232781 filed on Nov. 30, 2015, the entire contents of which are incorporated by reference herein.

BACKGROUND

The present disclosure relates to an execution control device that causes the other electronic device to execute a task, non-transitory computer-readable recording medium that stores an execution control program, and a task execution system.

As a task execution system in which one electronic device causes the other electronic device to execute a task, a typical system where a local-task that runs on a local computer can use a remote-task that runs on a remote computer is known. The local task firstly establishes conversations between a local data transmission agent in the local computer and a remote data transmission agent in the remote computer. Handles are allocated to the conversations. Thereafter, the local task can invoke the remote task running on the remote computer by using the handles. A shared memory buffer transceives data between the local task and the local data transmission agent. The shared memory buffer transceives the data also between the remote task and the remote data transmission agent.

SUMMARY

An execution control device as an electronic device according to one aspect of the present disclosure causes a task starting system to execute a task. The task starting system is provided in a task starting device and starts tasks in turn. The task starting device is another electronic device. The execution control device includes a control section and a storage section.

The control section governs overall operation controls of the execution control device.

The storage section stores an execution control program designed for causing the task starting system to execute the task.

By operating in accordance with the execution control program stored in the storage section, the control section operates as a task registration section that registers with the task starting system the task executable by the task starting system.

According to an another aspect of the present disclosure, a non-transitory computer-readable recording medium includes an execution control program designed for causing a task starting system to execute a task. The task starting system is provided in a task starting device and starts tasks in turn. The task starting device is an electronic device. The execution control program causes an information processing apparatus to operate as a task registration section, an execution termination determining section, and a task deleting section.

The task registration section registers with the task starting system the task executable by the task starting system.

The execution termination determining section determines whether or not an execution by the task starting system of the task having been registered with the task starting system by the task registration section is terminated.

The task deleting section deletes, from the task starting system, the task having been registered by the task registration section when the execution termination determining section determines that the task starting system terminated the execution of the task having been registered by the task registration section.

According to still another aspect of the present disclosure, a task execution system includes a task starting device provided with a task starting system that starts tasks in turn, and the above described execution control device as an electronic device that causes the task starting system to execute a task. The task starting device is another electronic device.

DETAILED DESCRIPTION

Hereinafter, a description will be given of an execution control device, an execution control program, a non-transitory computer-readable recording medium including the execution control program, and a task execution system all according to an embodiment as aspects of the present disclosure with reference to the drawings.

A description will be given of a configuration of the task execution system according to this embodiment.

Figure 1:
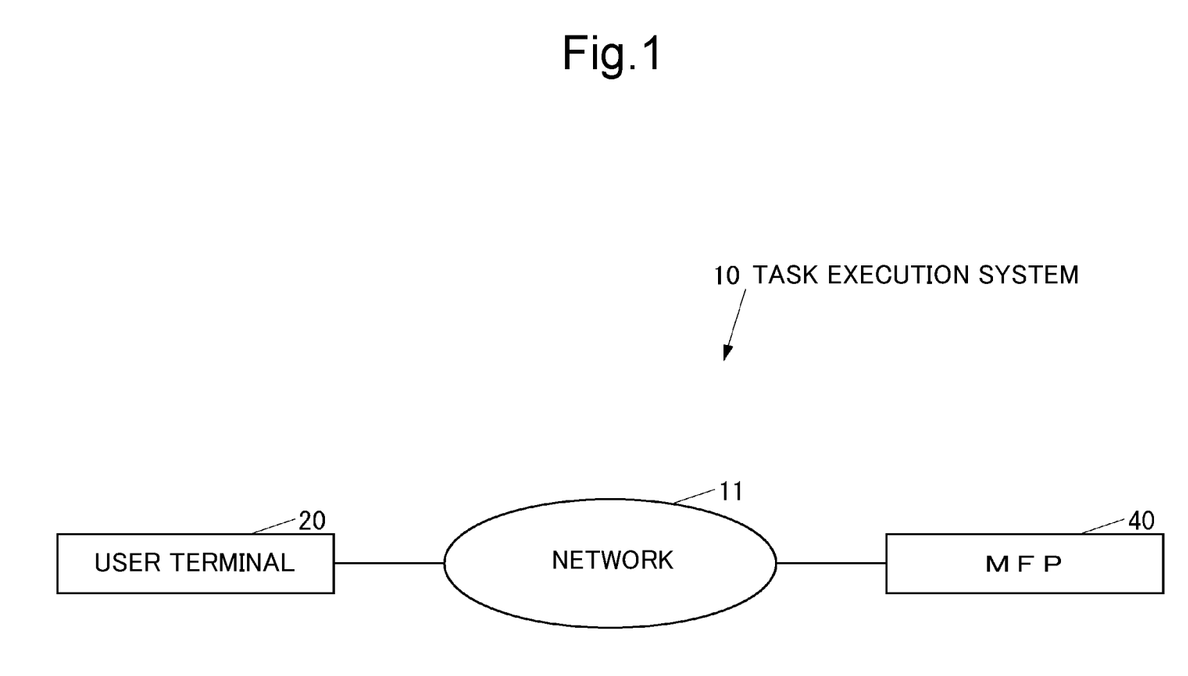
FIG. 1 is a schematic diagram illustrating a block configuration of a task execution system according to one embodiment of the present disclosure.

FIG. 1 is a schematic diagram illustrating a block configuration of a task execution system 10 according to this embodiment of the present disclosure.

As illustrated in FIG. 1, the task starting device 10 includes a user terminal 20 used by a user and an MFP 40. The user terminal 20 and the MFP 40 are mutually communicable via a network 11 such as a LAN (local area network) or the Internet.

Figure 2:
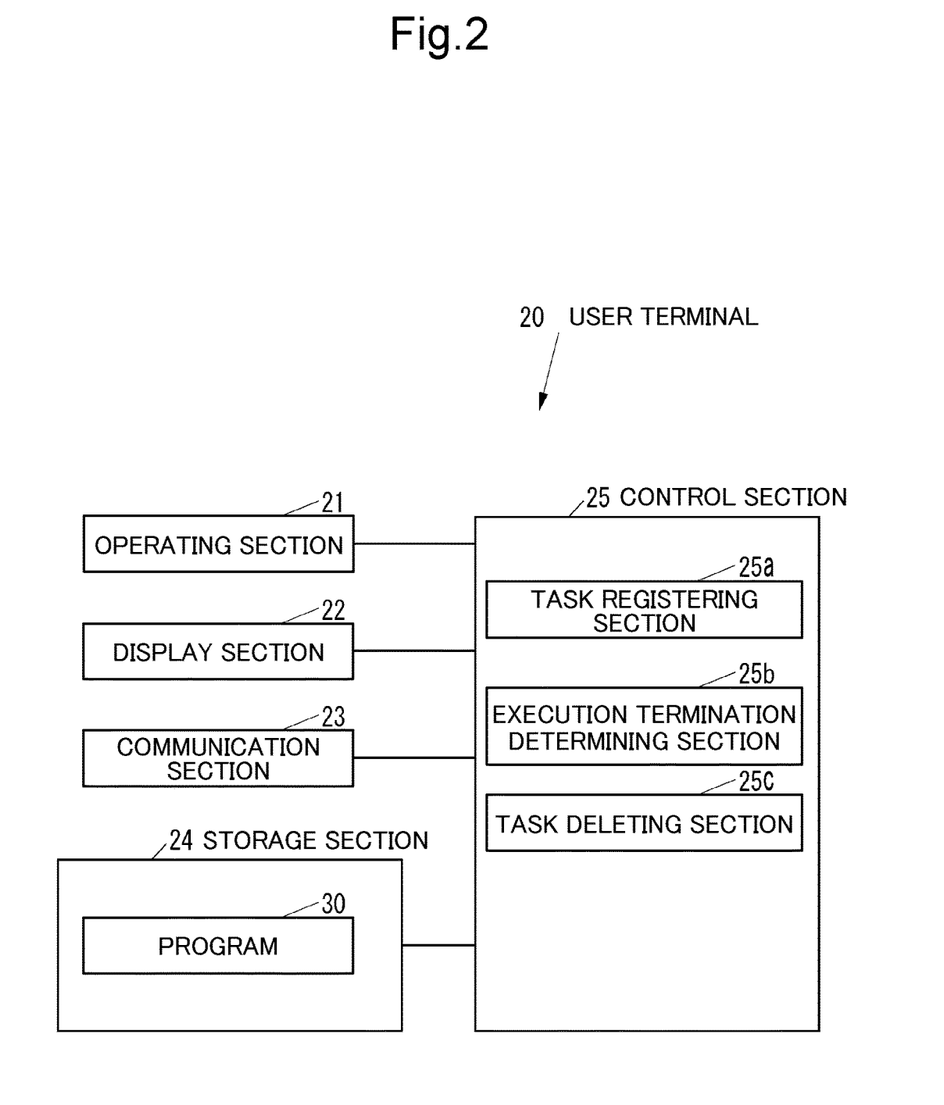
FIG. 2 is a schematic diagram illustrating a block configuration of a user terminal in FIG. 1.

FIG. 2 is a schematic diagram illustrating a block configuration of the user terminal 20.

As illustrated in FIG. 2, the user terminal 20 includes: an operating section 21 which is an input device, including a mouse and a keyboard, through which various operations are to be input by the user; a display section 22 which is a display device, such as an LCD (liquid crystal display), capable of displaying various types of information; a communication section 23 which is a communication device capable of communicating via the network 11 (see FIG. 1) with external devices; a storage section 24 which is a storage device, such as a semiconductor memory or an HDD (hard disk drive), including various types of data; and a control section 25 which controls the whole of the user terminal 20. The user terminal 20 is made up with a computer, such as a personal computer (PC).

The storage section 24 stores a program 30 to be executed by the user terminal 20 itself. The user terminal 20 may install the program 30 during the production stage. The user terminal 20 may also additionally install the program 30 from an external recording medium, such as a USB (universal serial bus) memory, or from the network 11.

Figure 3:
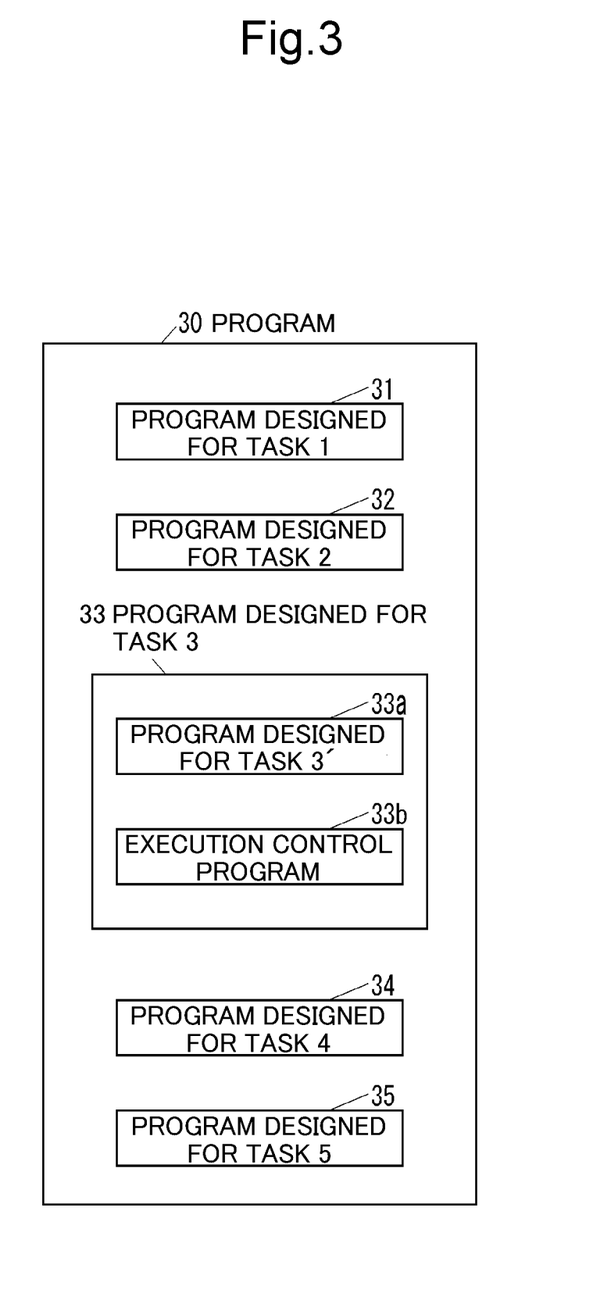
FIG. 3 is a schematic diagram illustrating a block configuration of an example of a program in FIG. 2.

FIG. 3 is a schematic diagram illustrating a block configuration of an example of the program 30.

As illustrated in FIG. 3, the program 30 includes: a program 31 designed for a task 1 for accomplishing the task 1 that is the first task to be executed out of tasks that the program 30 accomplishes; a program 32 designed for a task 2 for accomplishing the task 2 that is to be executed after the task 1; a program 33 designed for a task 3 for accomplishing the task 3 that is to be executed after the task 2; a program 34 designed for a task 4 for accomplishing the task 4 that is to be executed after the task 3; and a program 35 designed for a task 5 for accomplishing the task 5 that is to be executed after the task 4.

Each of the program 31 designed for the task 1, the program 32 designed for the task 2, the program 33 designed for the task 3, the program 34 designed for the task 4, and the program 35 designed for the task 5 may be created by a programming language, such as a script language, or may be a batch file.

The program 33 designed for the task 3 is independent from other parts of the program 30, and is a completely independent program. Other parts of the program 30 are the program 31 designed for the task 1, the program 32 designed for the task 2, the program 34 designed for the task 4, and the program 35 designed for the task 5. The program 33 designed for the task 3 includes: a program 33a designed for a task 3' for accomplishing the task 3' that is to be executed by the MFP 40 (see FIG. 1); and an execution control program 33b for causing the MFP 40 to execute the task 3'.

The program 33a designed for the task 3' is written in a language executable at the MFP 40. Examples of the executable language are so called a program, a script, a batch file and the like.

As illustrated in FIG. 2, the control section 25 includes, for example, a CPU (central processing unit), a ROM (read only memory) storing a program and various types of data, and a RAM (random access memory) for use as a workspace for the CPU. The CPU executes the program stored in the ROM or the storage section 24.

By executing the execution control program 33b of the program 30 stored in the storage section 24, the control section 25 functions as: a task registering section 25a that registers with a task starting system 48a (see FIG. 4) to be described hereinafter a task executable by the MFP 40, in which the task starting system 48a is an example of a second control section in "What is claimed is"; an execution termination determining section 25b that determines whether or not the execution of the task having been registered with the task starting system 48a by the task registration section 25a is terminated; and a task deleting section 25c that deletes, from the MFP 40, the task having been registered with the task starting system 48a by the task registration section 25a.

As thus far described, the user terminal 20 is an electronic device that causes the MFP 40 to execute a task, and configures the execution control device of this embodiment of the present disclosure.

Figure 4:
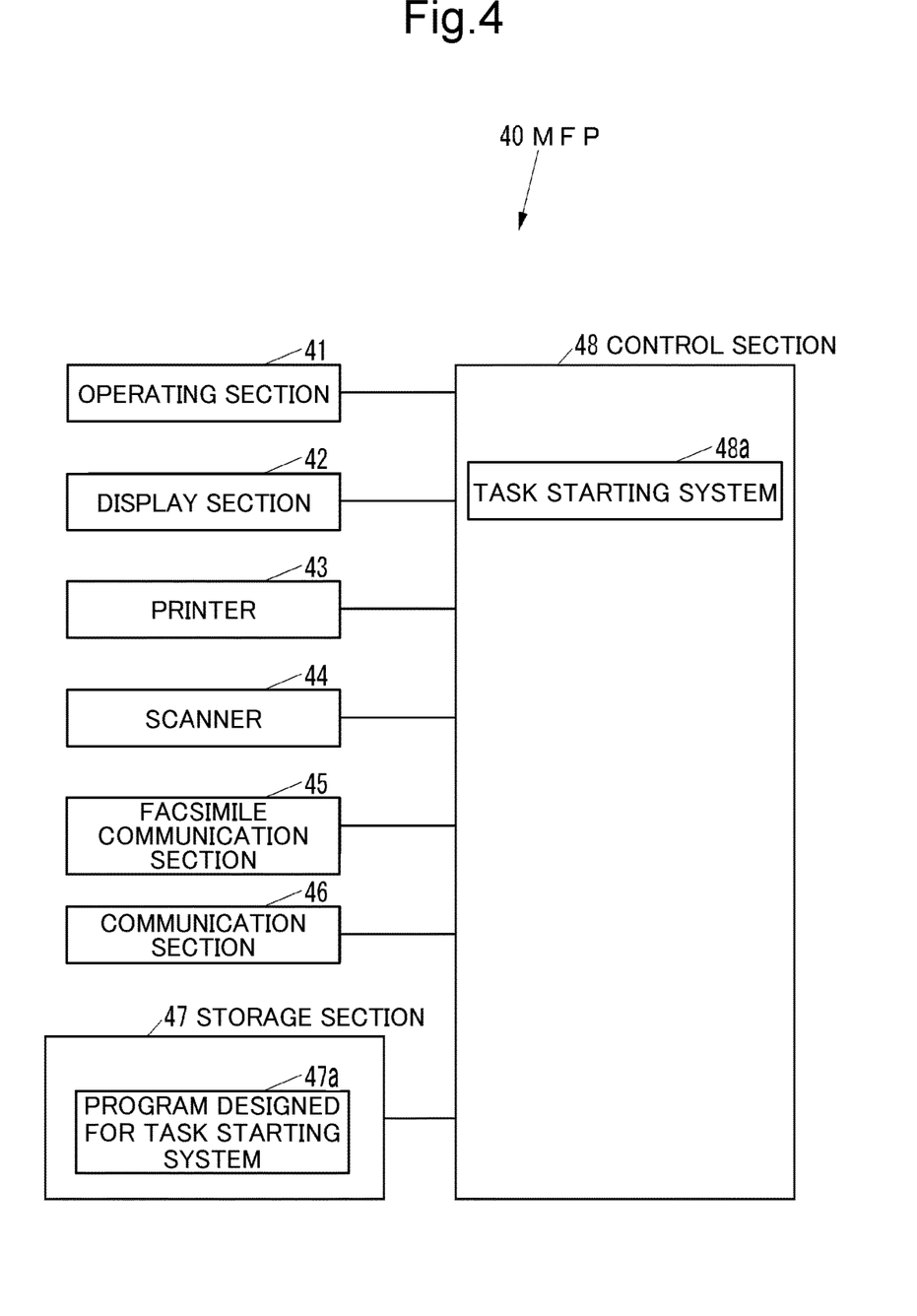
FIG. 4 is a schematic diagram illustrating a block configuration of a multifunction peripheral (MFP) in FIG. 1.

FIG. 4 is a schematic diagram illustrating a block configuration of the MFP 40.

As illustrated in FIG. 4, the MFP 40 includes: an operating section 41 which is an input device, including a button, through which various operations are to be input by the user; a display section 42 which is a display device, such as an LCD capable of displaying various types of information; a printer 43 which is a printing device that executes a printing on a recording medium, such as a paper sheet; a scanner 44 which is a scanning device that scans an image data from an original document; a facsimile communication section 45 which is a facsimile device configured to communicate by facsimile via a communication line, such as a public phone line, with not-illustrated external facsimile devices; a communication section 46 which is a communication device capable of communicating via the network 11 (see FIG. 1) with external devices; a storage section 47 which is a storage device, such as a semiconductor memory or an HDD, including various types of data; and a control section 48 which controls the whole of the MFP 40. The storage section 47 is an example of a second storage section in "What is claimed is".

The storage section 47 stores a program 47a designed for a task starting system for accomplishing the task starting system 48a to be described hereinafter that starts tasks in turn. The MFP 40 may install the program 47a designed for the task starting system during the production stage. The MFP 40 may also additionally install the program 47a designed for the task starting system from an external recording medium, such as a USB memory, or from the network 11.

The control section 48 includes, for example, the CPU, the ROM storing a program and various types of data, and the RAM for use as a workspace for the CPU. The CPU executes the program stored in the ROM or the storage section 47.

By executing the program 47a designed for the task starting system stored in the storage section 47, the control section 48 functions as the task starting system 48a. The task starting system 48a may be peculiar to a platform of the MFP 40. For example, if the platform of the MFP 40 is one of UNIX (registered trade mark) variants, the task starting system 48a is provided as a name "Cron", and if the platform of the MFP 40 is Windows (registered trade mark), the task starting system 48a is provided as a name "task scheduler". The task starting system 48a may be in a simple batch-processing environment in which tasks are started in turn.

As thus far described, the MFP 40 is an electronic device including the task starting system 48a that starts tasks in turn, and configures the task starting device of this embodiment of the present disclosure.

An operation of the task execution system 10 will now be explained.

Figure 5:
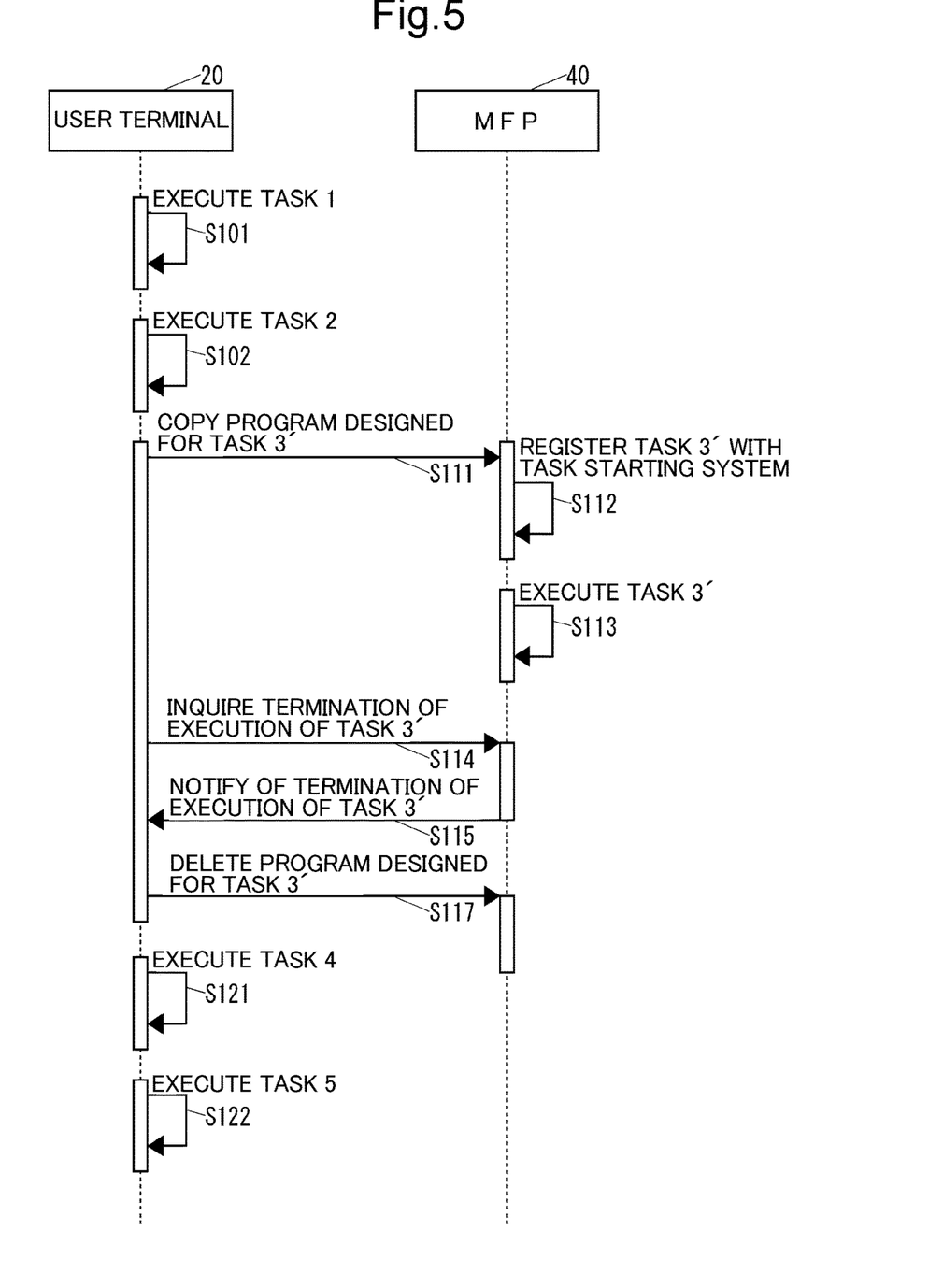
FIG. 5 is a sequence diagram of an operation of the task execution system of FIG. 1 in performing a program by the user terminal.

FIG. 5 is a sequence diagram of the operation of the task execution system 10 in performing the program 30 by the user terminal 20.

As illustrated in FIG. 5, the control section 25 of the user terminal 20 executes the task 1 by executing the program 31 designed for the task 1 (S101) and executes the task 2 by executing the program 32 designed for the task 2 (S102).

Then, the control section 25 executes the program 33 designed for the task 3 to thereby start an execution of the task 3.

Figure 6:
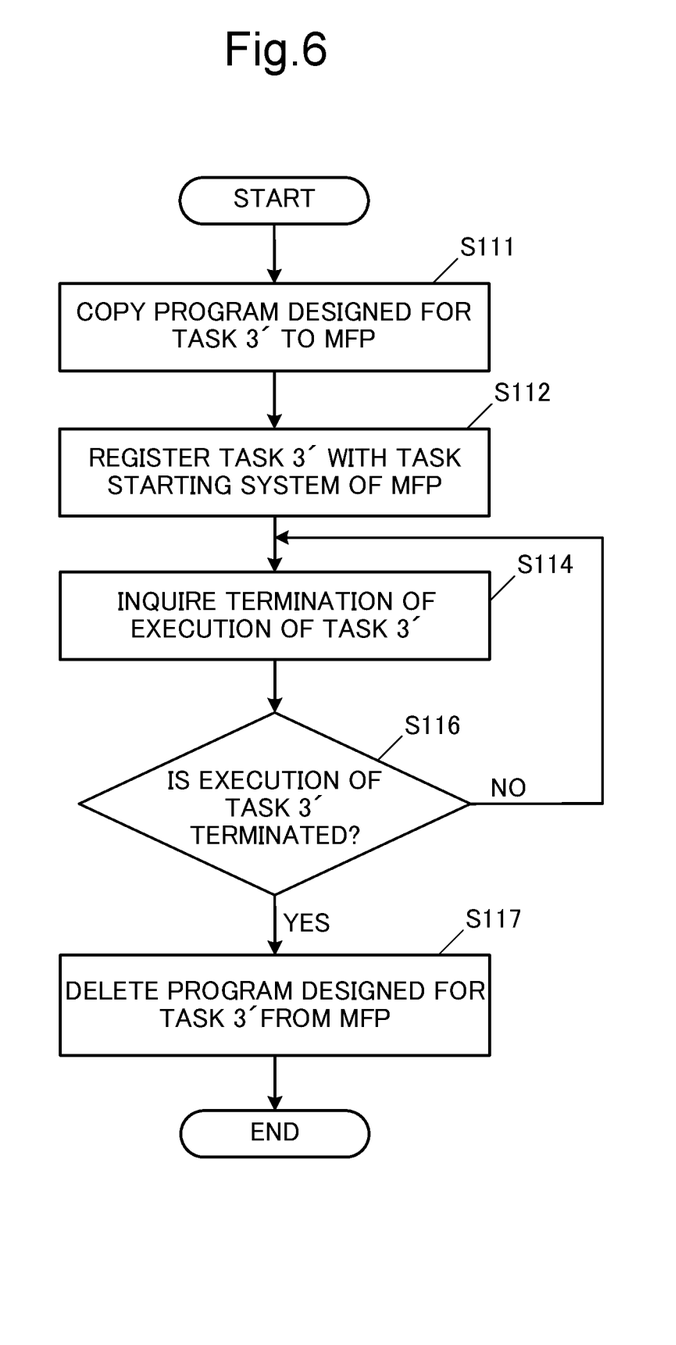
FIG. 6 is a flowchart of an operation of the user terminal of FIG. 2 in an execution of a program designed for a task.

FIG. 6 is a flowchart of the operation of the user terminal 20 in the execution of the program 33 designed for the task 3.

As illustrated in FIGS. 5 and 6, the task registering section 25a of the user terminal 20 remotely copies the program 33a designed for the task 3' to the MFP 40 via the communication section 23 (S111). This remote copying processing uses commonly used rcp and rsh, which are UNIX (registered trade mark) variants, and Server Message Block.

Then the task registering section 25a registers with the task starting system 48a of the MFP 40 the task 3' to be accomplished by the program 33a designed for the task 3' that has been copied to the MFP 40 in S111 (S112). Here, the task registering section 25a registers with the task starting system 48a the task 3' so that the task 3' is executed instantly.

The task starting system 48a of the MFP 40 executes the task 3' having been registered in S112 (S113).

After the processing of S112, the execution termination determining section 25b inquires of the MFP 40 whether or not the execution of the task 3' is terminated (S114).

Accordingly, the task starting system 48a of the MFP 40 notifies the user terminal 20 of whether or not the execution of the task 3' in S113 is terminated (S115).

The execution termination determining section 25b of the user terminal 20 determines whether or not the execution of the task 3' has been terminated based on the notification in S115 (S116).

Upon determining in S116 that the execution of the task 3' has not been terminated, the execution termination determining section 25b executes the processing in S114.

Upon determining in S116 that the execution of the task 3' has been terminated, the task deleting section 25c of the user terminal 20 remotely deletes, from the MFP 40, the task 3' (S117), namely the program 33a designed for the task 3', and terminates the execution of the task 3. This remote-deletion processing uses commonly used rcp and rsh, which are UNIX (registered trade mark) variants, and Server Message Block.

When the execution of the task 3 is terminated, the control section 25 of the user terminal 20 executes the program 34 designed for the task 4 to thereby execute the task 4 (S121), and executes the program 35 designed for the task 5 to thereby execute the task 5 (S122).

As thus far described, the user terminal 20 registers with the task starting system 48a included in the MFP 40 the executable task 3' by the MFP 40 to thereby cause the MFP 40 to execute the task 3'. Thus, conventional high-performance operating systems are not required to be included in the MFP 40 to cause the MFP to execute the task 3'. Therefore, for the user terminal 20, it is possible to suppress resource consumption led by configurations necessary to cause the MFP 40, which has limitation for specifications in comparison with a computer such as a PC, to execute the task 3'.

The user terminal 20 deletes from the MFP 40 the task 3' having been executed by the MFP 40 (S117), so that the consumption of the resources of the MFP 40 by the task 3' that has become unneeded can be suppressed.

When the execution of the task 3' by the MFP 40 is determined (YES in S116), the user terminal 20 deletes the task 3' from the MFP 40 (S117), so that the consumption of the resources of the MFP 40 by the task 3' that has become unneeded can be appropriately suppressed.

The user terminal 20 causes the MFP 40 to execute the task 3' by using the task starting system 48a included in the MFP 40. Therefore, the user terminal 20 causes the MFP 40 to appropriately execute the task 3' under authority of the user logging in the MFP 40.

Examples of processing to be accomplished by the program 30 are considered as follows. First, the user terminal 20 searches via the network 11 by the task 1 and the task 2 a plurality of target MFPs, then lists the searched plurality of MFPs on the display section 22, thereafter accepts via the operating section 21 the selected MFP 40 out of the listed MFPs. Next, the user terminal 20 causes the MFP 40 to execute by the task 3 the task 3' that enables information to be disclosed to the user terminal 20. The information includes various types of information, such as information on toner indicating residual amount of toner in the printer 43 and information on a counter indicating the number of sheets printed by the printer 43. Lastly, the user terminal 20 obtains various types of information, such as the information on toner and the information on the counter, from the MFP 40 by the task 4 and the task 5, and then displays the information on the display section 22.

Examples of the task 3' are: a task that causes the MFP to install or update a program designed for the MFP, such as a driver; and a task that causes the MFP to change settings of the MFP itself.

The execution termination determining section 25b inquires of the MFP 40 the termination of the execution of the task 3' in this embodiment. However, different methods other than inquiring of the MFP 40 the termination of the execution of the task 3' may be taken by the execution termination determining section 25b to determine whether or not the execution of the task 3' by the MFP 40 is terminated. For example, when there is processing that functions by the task 3' executed by the MFP 40, the execution termination determining section 25b can determine the termination of the execution of the task 3' executed by the MFP 40 with confirming that this processing is functioning properly.

When the execution termination determining section 25b determines that the execution of the task 3' by the MFP 40 has been terminated, the task deleting section 25c in this embodiment deletes the program 33a designed for the task 3' from the MFP 40. However, the task deleting section 25c may delete the program 33a designed for the task 3' from the MFP 40 without confirming the termination of the execution of the task 3' by the MFP 40. For example, the task deleting section 25c may delete the program 33a designed for the task 3' from the MFP 40 after a lapse of a certain time.

The program 31 designed for the task 1, the program 32 designed for the task 2, the program 33 designed for the task 3, the program 34 designed for the task 4, and the program 35 designed for the task 5 in the program 30 are programs independent from one another. In the program 33 designed for the task 3, the program 33a designed for the task 3' and the execution control program 33b are programs mutually independent from one another. Thus, the program 30 can be easily customized. For example, variation can be made on the program 30 with respect to any of the program 31 designed for the task 1, the program 32 designed for the task 2, the program 34 designed for the task 4, the program 35 designed for the task 5, the program 33a designed for the task 3', and the execution control program 33b.

Figure 7:
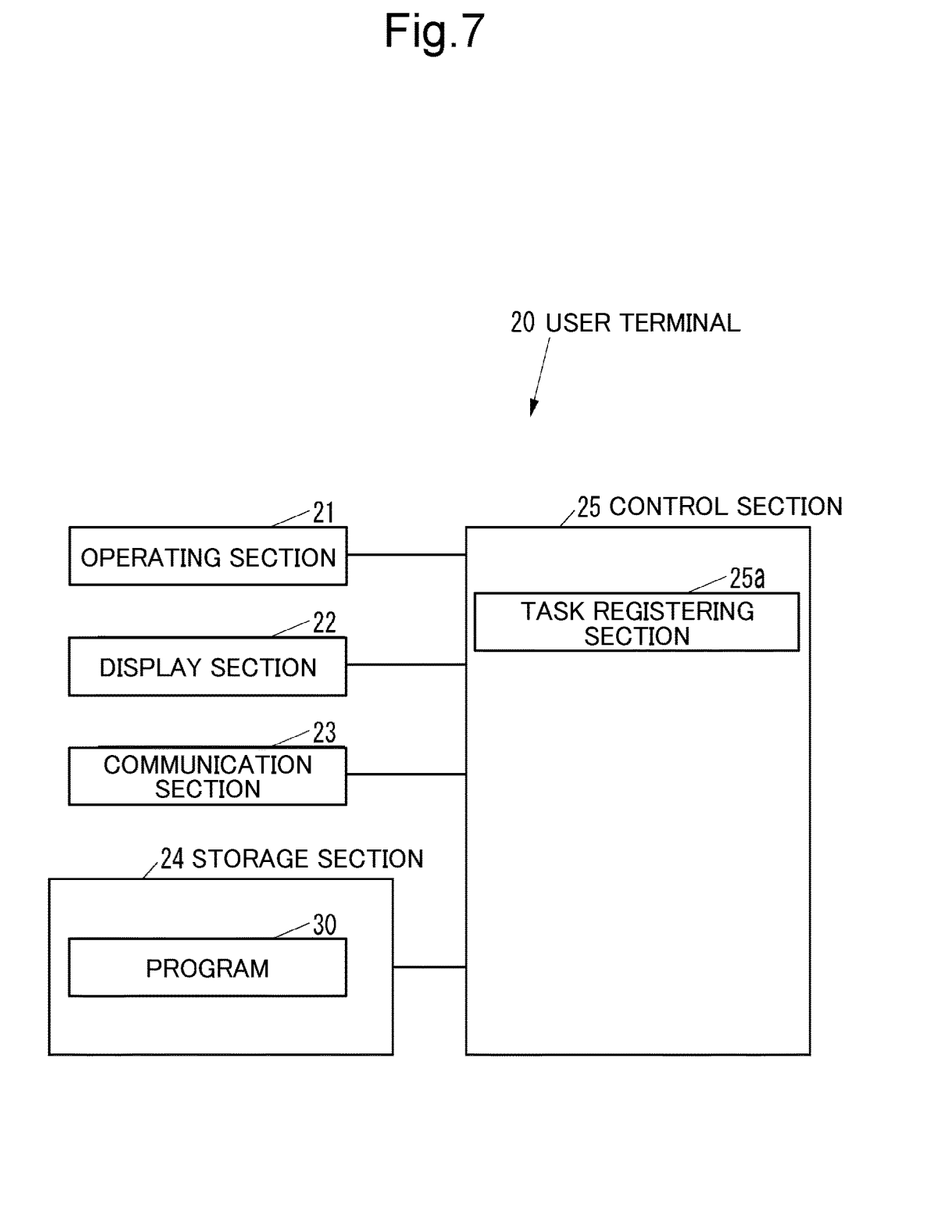
FIG. 7 is a schematic diagram illustrating a block configuration of the user terminal of FIG. 1 in not deleting a task.
Figure 8:
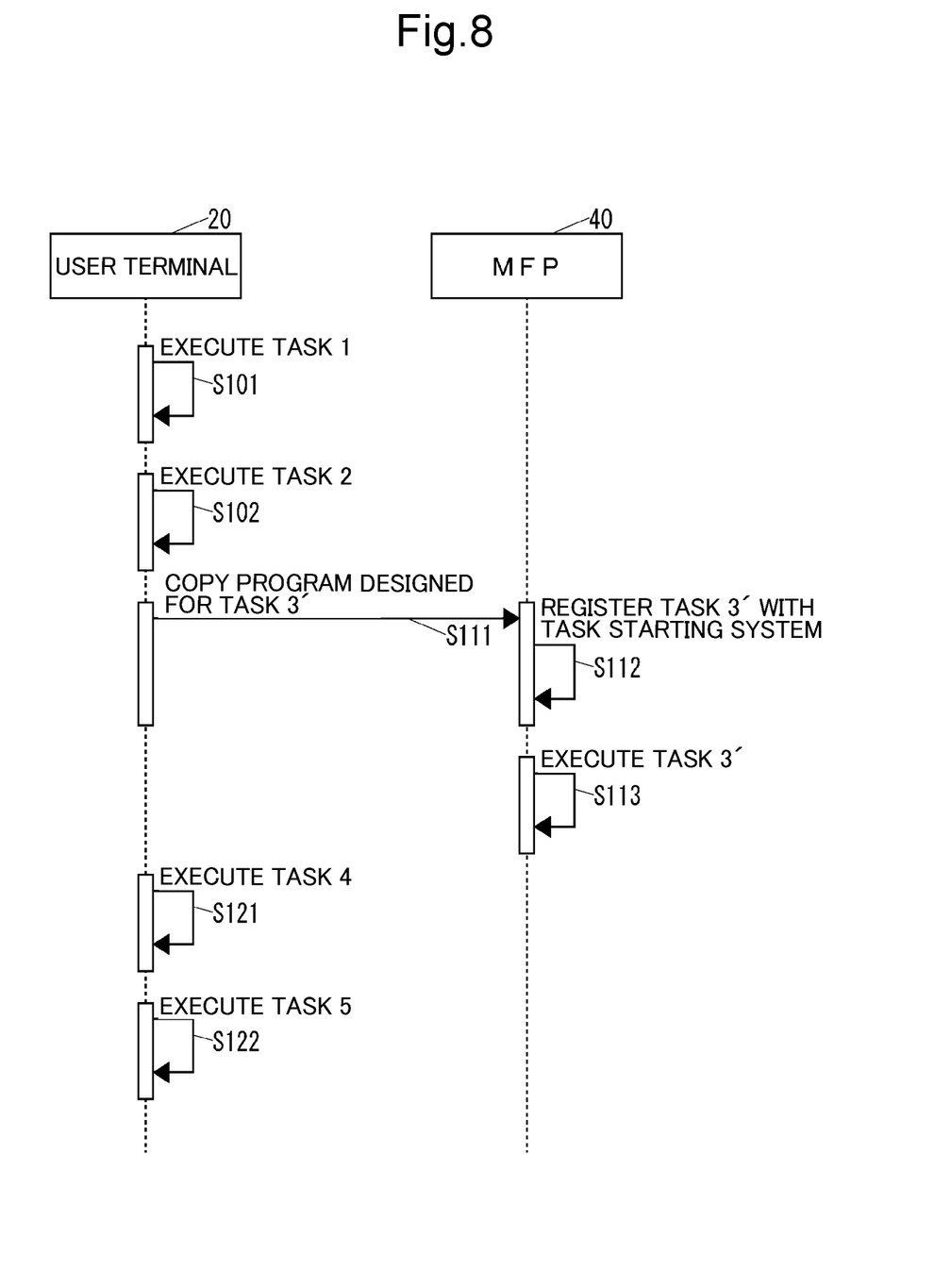
FIG. 8 is a sequence diagram of an operation of the task execution system of FIG. 1 when a program designed as not to delete the task from the MFP is executed by the user terminal.
Figure 9:
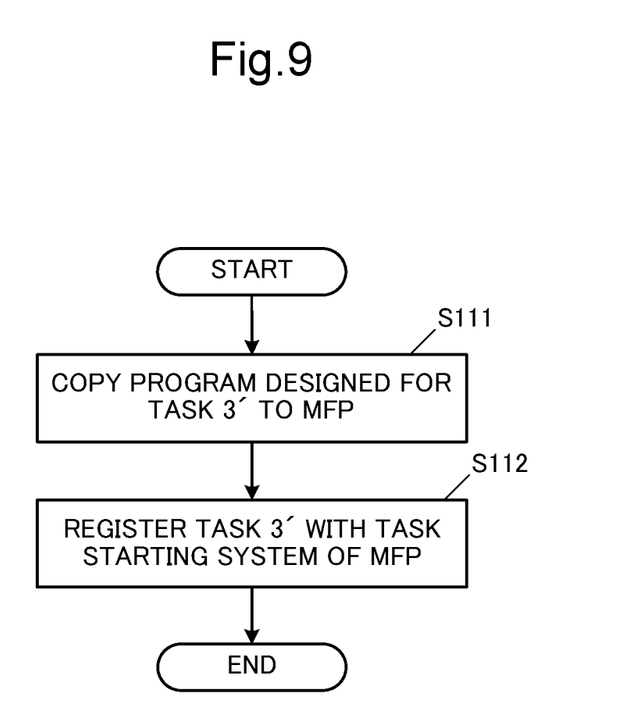
FIG. 9 is a flowchart of an operation of the user terminal of FIG. 2 in executing a program designed for a task 3 that does not delete the task from the MFP.

For example, by varying the execution control program 33b so as not to include the execution termination determining section 25b (see FIG. 2) and the task deleting section 25c (see FIG. 2) as FIG. 7 illustrates, the task 3' may not be deleted from the MFP 40 as FIGS. 8 and 9 illustrate.

Figure 10:
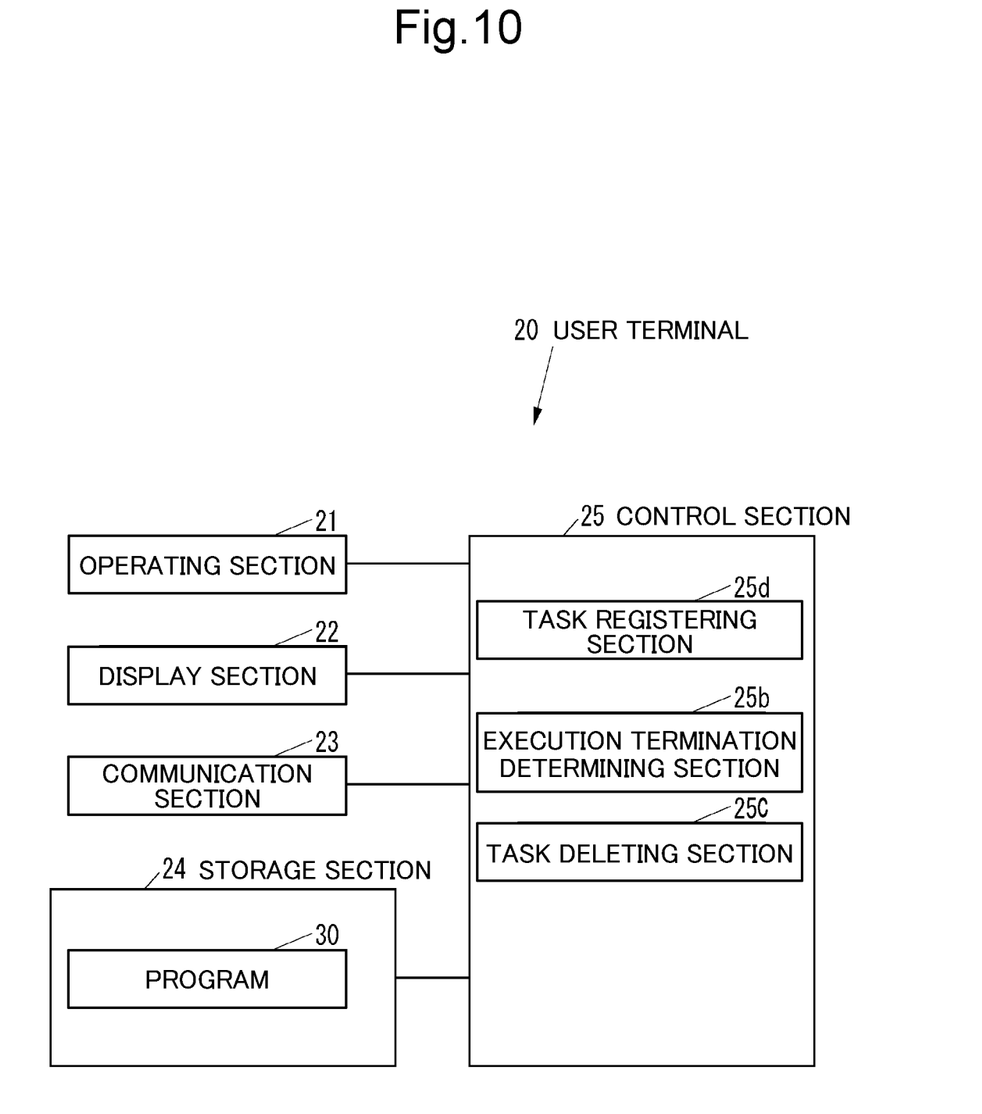
FIG. 10 is a schematic diagram illustrating a block configuration of the user terminal of FIG. 1 in causing the MFP to execute the task two times.
Figure 11:
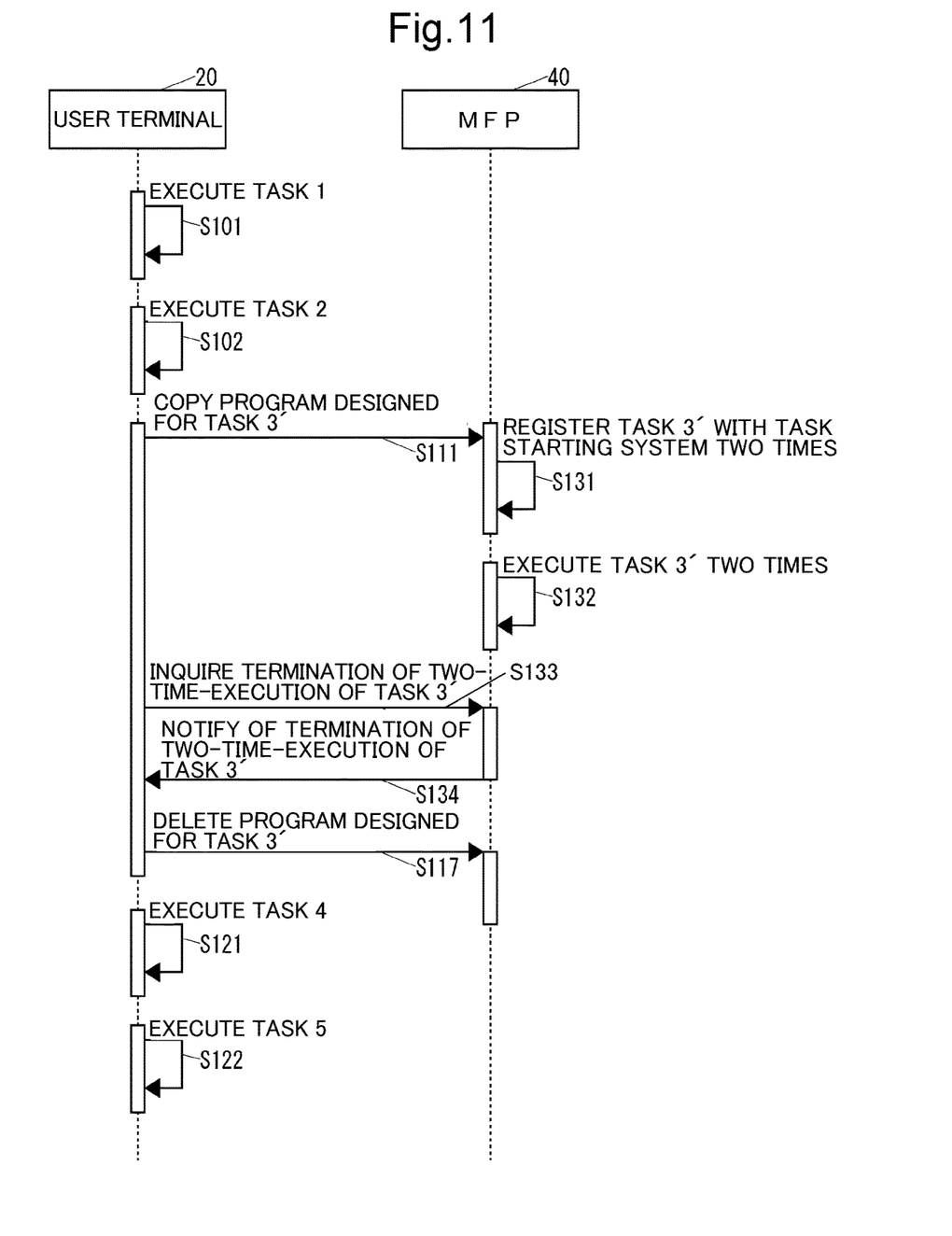
FIG. 11 is a sequence diagram of an operation of the task execution system of FIG. 1 when a program designed for causing the MFP to execute the task two times is executed by the user terminal.
Figure 12:
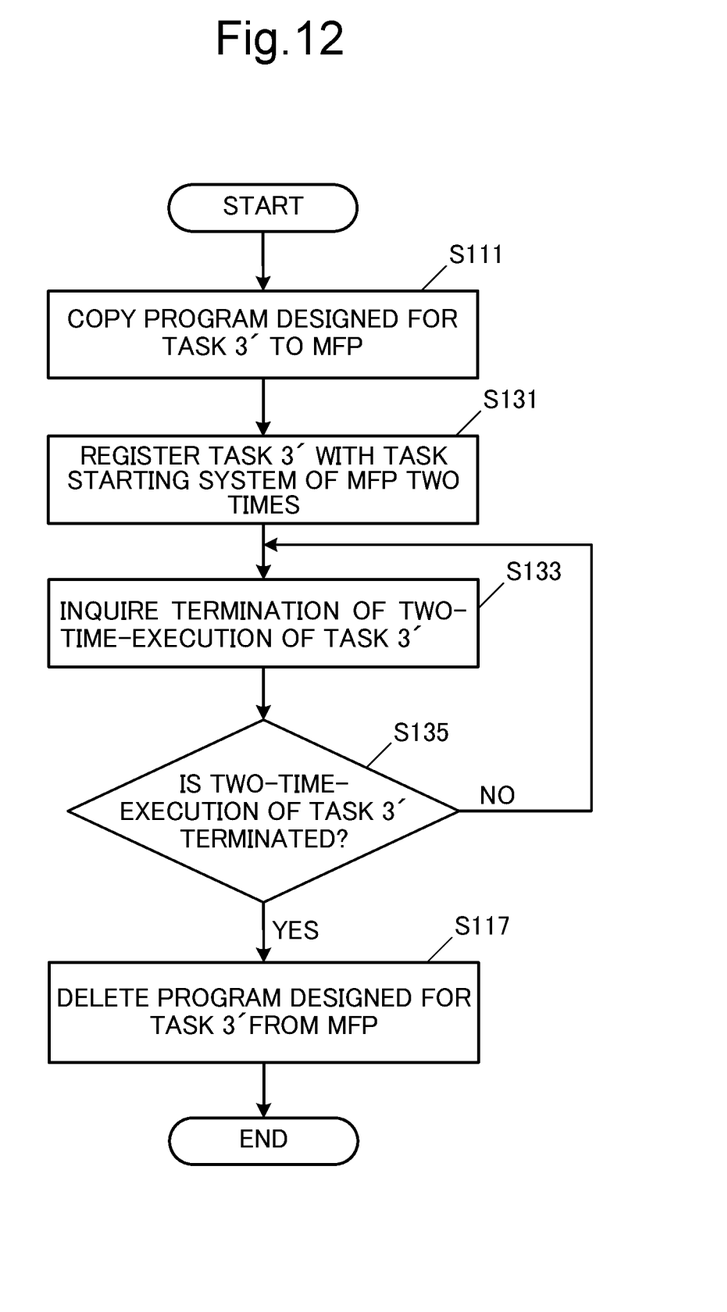
FIG. 12 is a flowchart of an operation of the user terminal of FIG. 2 when the program designed for causing the MFP to execute the task two times is executed.

In addition, by varying the execution control program 33b so as to include, in place of the task registering section 25a (see FIG. 2), a task registering section 25d that registers the task 3' two times as FIG. 10 illustrates, the MFP 40 may be caused to execute the task 3' two times as FIGS. 11 and 12 illustrate. Specifically, the task registering section 25d of the user terminal 20 registers, two times, the task 3', which is accomplished by the program 33a designed for the task 3' that has been copied to the MFP 40 in S111, with the task starting system 48a of the MFP 40 (S131). Then, the task starting system 48a of the MFP 40 executes two times the task 3' having been registered in S131 (S132). Next, after the processing in S131, the execution termination determining section 25b of the user terminal 20 inquires of the MFP 40 whether or not the two-time-execution of the task 3' is terminated (S133). Then, the task starting system 48a of the MFP 40 notifies the user terminal 20 of whether or not the two-time-execution of the task 3' in S132 is terminated (S134). The execution termination determining section 25b of the user terminal 20 determines whether or not the two-time-execution of the task 3' has been terminated based on the notification in S134 the task 3' (S135). Upon determining that the two-time-execution of the task 3' has not terminated in S135, the execution termination determining section 25b executes the processing of S133.

In the program 30, the program 33 designed for the task 3 for accomplishing the task 3, which is the middle task among five tasks 1-5 to be executed in succession, includes the execution control program 33b. However, the program 30 may be designed so as to accomplish tasks more than or less than five tasks. Additionally, in the program 30, the execution control program 33b may be included in a program designed for a task for accomplishing any tasks to be accomplished by the program 30 itself. The execution control program 33b may be included in any of the plurality of programs designed for tasks that constitute the program 30.

In the typical task execution system described in BACKGROUND, an electronic device requires a high-performance operating system for configurations necessary to cause the other electronic device to execute a task. Accordingly, there have been problems such that a large amount of resources of electronic devices is being consumed by the high-performance operating systems.

In contrast, according to aforesaid embodiment, the suppression of the resource consumption led by the configurations necessary to cause the other electronic device to execute a task can be achieved.

Although the "execution control device" of the present disclosure is a computer, such as a PC in this embodiment, the execution control device may be any image forming apparatuses, such as an MFP, an exclusive printer, an exclusive facsimile machine, and an exclusive copier. The execution control device may also be any electronic devices other than image forming apparatuses.

Although the "task starting device" of the present disclosure is an MFP, the task starting device may be any image forming apparatuses other than the MFP, such as an exclusive printer, an exclusive facsimile machine, and an exclusive copier. The task starting device may also be any electronic devices other than image forming apparatuses, such as a PC.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An execution control device as an electronic device causing a task starting system to execute a task, the task starting system being provided in a task starting device and starting tasks in turn, the task starting device being another electronic device, the execution control device comprising:
  a control section that governs overall operation controls of the execution control device; and
  a storage section that stores an execution control program designed for causing the task starting system to execute the task,
  wherein by operating in accordance with the execution control program stored in the storage section, the control section operates as;
  a task registration section that registers with the task starting system the task executable by the task starting system;
  an execution termination determining section that determines whether or not an execution by the task starting system of the task having been registered with the task starting system by the task registration section is terminated; and
  a task deleting section that deletes, from the task starting system, a program designed for a task for accomplishing the task having been registered by the task registration section when the execution termination determining section determines that the task starting system terminated the execution of the task having been registered with the task starting system by the task registration section is terminated,
  wherein the task registration section remotely copies a program written in a language of the task starting device, the program being the program designed for the task for accomplishing the task, to the task starting device, and registers with the task starting system the task to be accomplished by the program designed for the task having been copied to the task starting device, and
  the execution termination determining section inquires of the task starting device the termination of the execution of the task and determines that the execution by the task starting system of the task has been terminated based on notification indicating the termination of the execution notified from the task starting system of the task starting device.

2. A non-transitory computer-readable recording medium including an execution control program designed for causing a task starting system to execute a task, the task starting system being provided in a task starting device and starting tasks in turn, the task starting device being an electronic device, wherein
  the execution control program causes an information processing apparatus to operate as:

a task registration section that registers with the task starting system the task executable by the task starting system;

an execution termination determining section that determines whether or not an execution by the task starting system of the task having been registered with the task starting system by the task registration section is terminated; and a task deleting section that deletes, from the task starting system, a program designed for a task for accomplishing the task having been registered by the task registration section when the execution termination determining section determines that the task starting system terminated the execution of the task having been registered with the task starting system by the task registration section is terminated, wherein the task registration section remotely copies a program written in a language of the task starting device, the program being the program designed for the task for accomplishing the task, to the task starting device, and registers with the task starting system the task to be accomplished by the program designed for the task having been copied to the task starting device, and the execution termination determining section inquires of the task starting device the termination of the execution of the task and determines that the execution by the task starting system of the task has been terminated based on notification indicating the termination of the execution notified from the task starting system of the task starting device.

3. A task execution system including a task starting device provided with a task starting system that starts tasks in turn, and an execution control device as an electronic device that causes the task starting system to execute a task, the task starting device being another electronic device, the execution control device comprising:

a control section that governs overall operation controls of the execution control device; and a storage section that stores an execution control program designed for causing the task starting system to execute the task, wherein by operating in accordance with the execution control program stored in the storage section, the control section operates as;

a task registration section that registers with the task starting system the task executable by the task starting system;

an execution termination determining section that determines whether or not an execution by the task starting system of the task having been registered with the task starting system by the task registration section is terminated; and a task deleting section that deletes, from the task starting system, a program designed for a task for accomplishing the task having been registered by the task registration section when the execution termination determining section determines that the task starting system terminated the execution of the task having been registered with the task starting system by the task registration section is terminated, wherein the task registration section remotely copies a program written in a language of the task starting device, the program being the program designed for the task for accomplishing the task, to the task starting device, and registers with the task starting system the task to be accomplished by the program designed for the task having been copied to the task starting device, and the execution termination determining section inquires of the task starting device the termination of the execution of the task and determines that the execution by the task starting system of the task has been terminated based on notification indicating the termination of the execution notified from the task starting system of the task starting device.

4. The task execution system according to claim 3, the task starting device comprising:

a second control section that governs overall operation controls of the task starting device; and a second storage section that stores a program designed for the task starting system, wherein by operating in accordance with the program designed for the task starting system stored in the second storage section, the second control section operates as the task starting system that registers the task transmitted from the execution control device and executes the task.

* * * * *